(12) United States Patent
Yang et al.

(10) Patent No.: US 10,861,657 B2
(45) Date of Patent: Dec. 8, 2020

(54) BIDIRECTIONAL POWER VALVE AND CONTROL METHOD THEREFOR AND HYBRID MULTI-TERMINAL HVDC SYSTEM USING THE SAME

(71) Applicant: ABB Power Grids Switzerland AG, Baden (CH)

(72) Inventors: Xiaobo Yang, Beijing (CN); Bernt Bergdahl, Ludvika (SE); Chunming Yuan, Beijing (CN); Dawei Yao, Beijing (CN); Chao Yang, Beijing (CN)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 15/796,838

(22) Filed: Oct. 29, 2017

(65) Prior Publication Data

US 2019/0267198 A1 Aug. 29, 2019

Related U.S. Application Data

(63) Continuation of application No. PCT/CN2015/086099, filed on Aug. 5, 2015.

(51) Int. Cl.
*H01H 9/54* (2006.01)
*H01H 33/59* (2006.01)
(Continued)

(52) U.S. Cl.
CPC ............ *H01H 9/548* (2013.01); *H01H 9/541* (2013.01); *H01H 9/542* (2013.01);
(Continued)

(58) Field of Classification Search
CPC ........ H01H 9/548; H01H 9/541; H01H 9/542; H01H 33/596; H02J 3/36; H02M 7/7575; G05F 1/00; Y02E 60/60
(Continued)

(56) References Cited

U.S. PATENT DOCUMENTS 8,717,716 B2 5/2014 Häfner et al.
9,634,476 B1 4/2017 Cao et al.

FOREIGN PATENT DOCUMENTS

CN 102231520 A 11/2011
CN 102522764 A 6/2012
(Continued)

OTHER PUBLICATIONS

Machine Translation of Kinoshita et al. Japanese Patent Document JP S60-29018 A Feb. 14, 1985 (Year: 1985).*
(Continued)

*Primary Examiner* — Kevin J Comber
(74) *Attorney, Agent, or Firm* — Slater Matsil, LLP

(57) ABSTRACT

An objective of the invention is to provide a bidirectional power valve for current occurring in a high voltage DC conductor, control method therefor, hybrid multi-terminal HVDC System using the same. The bidirectional power valve includes a first power diode arrangement of a first conducting direction, a second power diode arrangement of a second conducting direction; a mechanical disconnector, being connected with the second power diode arrangement in series; wherein: the first power diode arrangement and the series-connected second power diode arrangement and the mechanical disconnector are connected in parallel; and the first conducting direction of the first power diode arrangement and the second conducting direction of the second power diode arrangement are opposite to each other. The current commutation and re-commutation can be achieved with less requirement of the timing accuracy of switching event which makes the usage of a mechanical disconnector and power diode feasible. This will then result in a significant reduction of cost and power transfer losses.

14 Claims, 3 Drawing Sheets

(51) Int. Cl.
   *H02J 3/36* (2006.01)
   *H02M 7/757* (2006.01)
   *G05F 1/00* (2006.01)

(52) U.S. Cl.
   CPC ............ *H01H 33/596* (2013.01); *H02J 3/36* (2013.01); *H02M 7/7575* (2013.01); *G05F 1/00* (2013.01); *Y02E 60/60* (2013.01)

(58) Field of Classification Search
   USPC ....................................................... 361/93.1
   See application file for complete search history.

(56) References Cited

FOREIGN PATENT DOCUMENTS

| | | | |
|---|---|---|---|
| CN | 102687221 | A | 9/2012 |
| CN | 102969732 | A | 3/2013 |
| CN | 103107549 | A | 5/2013 |
| CN | 103269083 | A | 8/2013 |
| CN | 103337851 | A | 10/2013 |
| CN | 103427433 | A | 12/2013 |
| CN | 103427434 | A | 12/2013 |
| CN | 103837827 | A | 6/2014 |
| CN | 204030390 | U | 10/2014 |
| CN | 203983165 | U | 12/2014 |
| CN | 104993509 | A | 10/2015 |
| EP | 2634882 | A1 | 9/2013 |
| EP | 2790285 | A1 | 10/2014 |
| JP | 60029018 | A * | 2/1985 ............ H03K 17/73 |
| WO | 2011157300 | A1 | 12/2011 |
| WO | 2012119645 | A1 | 9/2012 |
| WO | 2014117613 | A1 | 8/2014 |

OTHER PUBLICATIONS

International Search Report and Written Opinion, PCT/CN2015/086099, ABB Technology Ltd., Apr. 12, 2016, 10 pages.

T. Geng et al., "LCC-MMC Hybrid HVDC Transmission System," Transactions of China Electrotechnical Society, dated Oct. 2013, 10 pp., vol. 28, No. 10, China Academic Journal Electronic Publishing House, Beijing, China.

P. M. M. Portugal et al., "Hybrid HVDC System Using Current and Source Voltage Converters," Colloquium on HVDC and Power Electronics to Boost Network Performance, dated Oct. 2, 2013, 10 pp., Cigre, Paris, France.

Y. Lee et al., "Control of Hybrid HVDC Transmission System with LCC and FB-MMC," 2014 IEEE Energy Conversion Congress and Exposition (ECCE), dated Nov. 13, 2014, pp. 475-482, IEEE, Piscataway, USA.

R. Billinton et al., "Reliability Evaluation of Hybrid Multiterrninal HVDC Subtransmission Systems," IEE Proceedings—Generation, Transmission and Distribution, dated Sep. 2002, pp. 571-577, vol. 149, No. 5, IET, Stevenage, United Kingdom.

F. Wu et al., "Design of Main Connection Scheme for Zhoushan Flexible Multi-Terminal HVDC Transmission Project," Power System Technology, dated Oct. 2014, pp. 2651-2657, vol. 38, No. 10, China Academic Journal Electronic Publishing House, Beijing, China.

M. A. Thahir et al., "Investigations on Modern Self-Defined Controller for Hybrid HVDC Systems," TENCON 2011—2011 IEEE Region 10 Conference, dated Jan. 12, 2012, pp. 938-943, IEEE, Piscataway, USA.

J. Häfner et al., "Proactive Hybrid HVDC Breakers—A Key Innovation for Reliable HVDC Grids," The Electric Power System of the Future—Integrating Supergrids and Microgrids International Symposium, dated 2011, 9 pp. Cigre, Paris, France.

G. Tang et al., "A LCC and MCC Hybrid HVDC Topology with DC Line Fault Clearance Capability," International Journal of Electrical Power and Energy Systems, dated Jun. 3, 2014, pp. 419-428, vol. 62, Elsevier, Ltd., Amsterdam, Netherlands.

B. Andersen et al., "Technical Brochure 269: VSC Transmission—Working Group B4.37," International Conference of Large High-Voltage Electronic Systems, dated Apr. 2005, 162 pp., Cigre, Paris, France.

H. Jiang et al., "Multiterminal HVDC Systems in Urban Areas of Large Cities," IEEE Transactions on Power Delivery, dated Oct. 1998, pp. 1278-1284, vol. 13, No. 4, IEEE, Piscataway, USA.

Feedtech, "Research on Interaction between HVDC Transmission Technology and AC/DC Transmission System," last accessed Mar. 21, 2018, 6 pp., available at http://feedtech.cn/yanjiuketi03.htm.

The State Intellectual Proprty Office of the P.R. of China, Patent Search Report in corresponding application No. 201580080654.2, dated Jun. 11, 2019, 2 pp.

The State Intellectual Proprty Office of the P.R. of China, Office Action in corresponding application No. 201580080654.2, dated Jun. 19, 2019, 4 pp.

The European Patent Office, Extended European Search Report in corresponding application No. 15900044.7, dated Feb. 13, 2019, 7 pp.

* cited by examiner

BIDIRECTIONAL POWER VALVE AND CONTROL METHOD THEREFOR AND HYBRID MULTI-TERMINAL HVDC SYSTEM USING THE SAME

TECHNICAL FIELD

The invention relates to a power valve, and more particularly to a bidirectional power valve, its control method and hybrid multi-terminal high voltage direct current system (HVDC) using the same.

BACKGROUND ART

It is known that a power diode can be used in HVDC system allowing, through the direct current (DC) transmission line, direct current to pass in one direction to an inverter, while blocking the direct current in the opposite direction. Blocking the direct current in the opposite direction is important for breaking of fault currents occurring in the DC transmission line, in general as a consequence of short circuits to earth.

An arrangement of power diode of such kind is described in "A LCC and MMC hybrid HVDC topology with DC line fault clearance capability", Geng Tang and Zheng Xu, Volume 62, November 2014, International Journal of Electrical Power & Energy Systems. This paper proposes a hybrid multi-terminal HVDC system (hybrid MTDC system), in which the rectifier adopts a line commutated converter (LCC) and the inverters adopt two voltage source converters (VSCs). It provides DC transmission line fault clearance capability suitable for bulk power transmission. Resiliency to DC transmission line faults can be achieved by the power diodes installed in the overhead line (DC transmission line) close to the inverters. Simulation results of a DC transmission line fault confirm the feasibility that the fault current paths can be blocked by the installed power diodes. Because of the power diodes placed between the VSCs, it is impossible to carry out power support therebetween and thus the flexibility of the hybrid MTDC system is decreased.

A bypass circuit for the power diode might be needed for bypassing a DC current in the opposite direction where the power diode is reverse-biased. The bypass circuit and the power diode constitute a bidirectional power valve. An example of circuit topology is disclosed in patent EP 2 790 285. In particular considering the description concerning FIG. 1, it teaches a bidirectional power valve (bidirectional switch) consists of a pair of inverse-parallel-connected thyristors, a first of the thyristors acting as the bypass circuit to a second thereof and being able to conduct the bypassing DC current in the opposite direction with respective to the second. The skilled person shall understand that where the second thyristor were to be replaced by a power diode with the same conducting direction, the first thyristor can operate bypassing the revered DC current as well. Although such three-terminal power semiconductor device, such as thyristor, IGBT and so on, responds almost instantaneously to the demand of the control, it brings about a disadvantage of relatively high cost and also transfer losses when the DC current flows the three-terminal power semiconductor device.

Compared thyristor, the diode has obvious lower cost due to simple manufacture and non-control requirements. Although the diode cannot control electrical conduction, it can block current flow from one direction. Besides, the power losers of diode is partly less than thyristor. Mechanical disconnector has highly lower power losses and cost than the previous two semiconductor devices. In addition, the mechanical disconnector also have the turn-on and turn-off functions, although the action cannot be implemented under current flow.

BRIEF SUMMARY OF THE INVENTION

According an aspect of present invention, it provides a bidirectional power valve for current occurring in a high voltage DC conductor, including: a first power diode arrangement of a first conducting direction; a second power diode arrangement of a second conducting direction; a mechanical disconnector, being connected with the second power diode arrangement in series; wherein: the first power diode arrangement and the series-connected second power diode arrangement and the mechanical disconnector are connected in parallel; and the first conducting direction of the first power diode arrangement and the second conducting direction of the second power diode arrangement are opposite to each other.

According to another aspect of present invention, it provides a direct current path commutation method, including: (a) forward bias of a first power diode arrangement of a first conducting direction while a voltage across the first power diode arrangement being placed across series-connected opened mechanical disconnector and a second power diode arrange of a second conducting direction; (b) closing the mechanical disconnector; and (c) forward bias of the second power diode arrangement; wherein: the first conducting direction of the first power diode arrangement and the second conducting direction of the second power diode arrangement are opposite to each other.

By using the bidirectional power valve and the direct current path commutation method, the first power diode arrangement can be forward-biased and the built-in potential of the first power diode arrangement is applied across the series-connected second power diode arrangement and mechanical disconnector. The second power diode arrangement is revers-biased due to the parallel connection. Before commutation from the first power diode arrangement to the series-connected second power diode arrangement and mechanical disconnector takes place, the mechanical disconnector will be closed. Thanks to the anti-parallel-connection of the first power diode arrangement and the second power diode arrangement, the mechanical disconnector can be closed while the first power diode arrangement is forward biased conducting current. Therefore, the timing of closing the mechanical disconnector may be set within a period of time before the current reverse. Considering that closing of the mechanical disconnector will take some ms after the moment it receives the external control signal commanding it to do so, the signal can be issued so long as before a period of the some ms ahead of the current reverse. Then, the second power diode arrangement 11 is forward biased upon the current direction change, and the current is commuted from the first power diode arrangement to the series-connected second power diode arrangement 11 and the mechanical disconnector. In re-commutation, the first power diode arrangement is forward biased and consequently the mechanical disconnector is opened at zero current, commuting the current of the second power diode arrangement to the first power diode arrangement. The current commutation and re-commutation can be achieved with less requirement of the timing accuracy of switching event which makes the usage of a mechanical disconnector and power diode feasible. This will then result in a significant reduction of cost and power transfer losses.

According to another aspect of present invention, it provides a hybrid multi-terminal high voltage direct current system, including: the bidirectional power valve for the current occurring in the high voltage DC conductor as mentioned above; a LCC-based rectifier; a first VSC-based inverter; and a second VSC-based inverter; wherein: the first VSC-based inverter is connected to either of the LCC-based rectifier and the second VSC-based inverter via the high voltage DC conductor and the bidirectional power valve; and the first conducting direction of the first power diode arrangement of the bidirectional power valve points towards the first VSC-based inverter.

According to another aspect of present invention, the first power diode arrangement includes a multiple of first power diode units connected in series, the second power diode arrangement includes a second power diode unit, and a peak inverse voltage of the second power diode unit substantially is equal to or above a sum of forward-biased voltages of the multiple of first power diode units and below a predetermined times of the sum. Since the DC voltage of the second power diode arrangement is clamped by the first power diode arrangement, the voltage stress on the second power diode arrangement during opening the mechanical disconnector should be relatively low. Therefore, when designing the bidirectional power valve, the relevant parameters of the second power diode arrangement could be selected at relatively low ratings.

According to another aspect of present invention, it provides a method for operation of a hybrid multi-terminal high voltage direct current system, including: (a) forward bias of a first power diode arrangement of a first conducting direction while a voltage across the first power diode arrangement being placed across series-connected an opened mechanical disconnector and a second power diode arrange of a second conducting direction; (b) a LCC-based rectifier supplying power to a first VSC-based inverter through the first power diode arrangement; (c) closing the mechanical disconnector; (d) blocking the LCC-based rectifier and switching the first VSC-based inverter to operate as a rectifier; and (e) forward bias of the second power diode arrangement and the first VSC-based inverter operating as the rectifier supplying power to a second VSC-based inverter via the closed mechanical disconnector and the second power diode arrangement; wherein: the first conducting direction of the first power diode arrangement and the second conducting direction of the second power diode arrangement are opposite to each other.

By using the bidirectional power valve in the hybrid MTDC system and the method for operation of the same, the VSC-based inverters are able to support power therebetween during the LCC-based rectifier is blocked. The first VSC-based inverter operating as rectifier supplies DC power to the second VSC-based inverter through the series-connected closed mechanical disconnector and the second power diode arrangement of the bidirectional power valve installed close to itself. This makes it possible achieving on-line effortless power reverse of VSC in the hybrid MTDC system, and still retaining the worthy DC fault clearance capability with the power valve.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods and programming procedures, devices, and circuits are omitted so not to obscure the description of the present invention with unnecessary detail.

Figure 1:
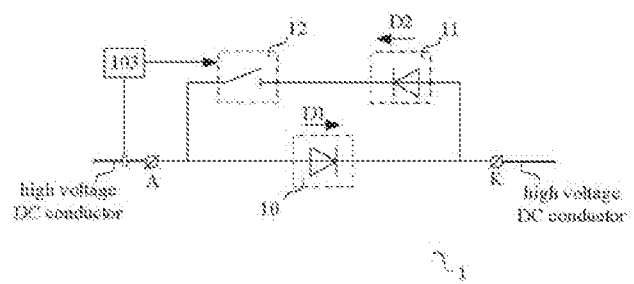
FIG. 1 illustrates a bidirectional power valve for current occurring in a high voltage DC conductor according to an embodiment of present invention.

FIG. 1 illustrates a bidirectional power valve for current occurring in a high voltage DC conductor according to an embodiment of present invention. As shown in FIG. 1, the bidirectional power valve 1 includes a first power diode arrangement 10, a second power diode arrangement 11 and a mechanical disconnector 12. The bidirectional power valve 1 is connected with the high voltage DC conductor to control the current flowing thereon.

The first power diode arrangement 10 may have one first power diode unit or more connected in series to function as one single semiconductor switch and configured to allow the current to pass through it in a first conducting direction D1 (the first power diode's forward direction). The second power diode arrangement 11 may have one second power diode unit or more connected in series to function as one single semiconductor switch and configured to allow the current to pass through it in a second conducting direction D2 (the second power diode's forward direction), as well. The mechanical disconnector 12 can be a DC mechanical disconnector, the operation of which is controlled by an external control signal. Unlike circuit breaker, the mechanical disconnector lacks the mechanism for suppression of electric arc occurring when conductors carrying high currents are electrically interrupted. The second power diode arrangement 11 and the mechanical disconnector 12 are connected in series and configured to block the current in a direction opposite to the second conducting direction and open/close the current path following the external control signal.

The first power diode arrangement 10 and the series-connected second power diode arrangement 11 and mechanical disconnector 12 are connected in parallel across connection points A, K, and the first conducting direction D1 of the first power diode arrangement 10 is arranged opposite to the second conducting direction D2 of the second power diode arrangement 11.

By using the bidirectional power valve 1, the first power diode arrangement 10 can be forward-biased under the circumstance of current flowing from point A to K, and the built-in potential of the first power diode arrangement 10 is applied across the series-connected second power diode arrangement 11 and mechanical disconnector 12. In such scenario, the current flows through the first power diode arrangement 10 in the first conducting direction D1. The second power diode arrangement 11 is revers-biased due to the parallel connection as described above. For avoidance of undesirable current direction reverse, for example a current flowing in the direction from K to A as a result of high voltage DC conductor short-circuit to earth, the mechanical disconnector 12 keeps open. The skilled person shall understand that in some scenarios the current will be required to change its direction from A towards K to K towards A in a power system. Before the current direction change takes place, the mechanical disconnector will be closed. Thanks to the anti-parallel-connection of the first power diode arrangement 10 and the second power diode arrangement 11, the mechanical disconnector can be closed while the first power diode arrangement 10 is forward biased conducting current. Therefore, the timing of closing the mechanical disconnector 12 may be set within a period of time before the current reverse. Considering that closing of the mechanical disconnector 12 will take some ms after the moment it receives the external control signal commanding it to do so, the signal can be issued so long as before a period of the some ms ahead of the current reverse. Then, the second power diode arrangement 11 is forward biased upon the current direction change, and the current is commuted from the first power diode arrangement 10 to the series-connected second power diode arrangement 11 and the mechanical disconnector 12. Re-commutation occurs where the current direction changes back from K towards A to A towards K. The first power diode arrangement 10 is forward biased and consequently the mechanical disconnector 12 is opened at zero current, commuting the current of the second power diode arrangement 11 to the first power diode arrangement 10.

The current commutation and re-commutation can be achieved with less requirement of the timing accuracy of switching event which makes the usage of a mechanical disconnector and power diode feasible. This will then result in a significant reduction of cost and power transfer losses.

As an alternative, the series-connected second power diode arrangement 11 and the mechanical disconnector 12 can be replaced by a circuit breaker.

A power valve controller 13 can send the control signal to the mechanical disconnector 12 to open the mechanical disconnector in response to a commutation of the high voltage DC conductor current direction from the second conducting direction to the first conducting direction. A current sensor 14 can sense a direction of the high voltage DC conductor current and send a signal representing it to the power valve controller 13. The mechanical disconnector 12 is controlled to be opened where the signal indicates the high voltage DC conductor current direction is lined with the first conducting direction D1 of the first power diode arrangement 10. The power valve controller 13 can further control to close the mechanical disconnector 12 in response to a commutation of the high voltage DC conductor current direction from the first conducting direction D1 to the second conducting direction D2.

Figure 2A:
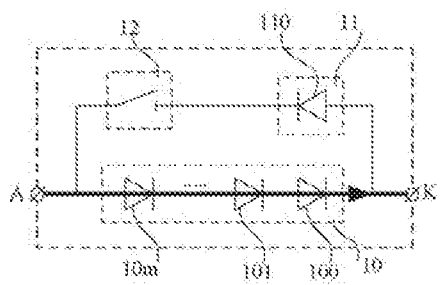
FIGS. 2A, 2B and 2C show commutation operation of the bidirectional power valve according to FIG. 1.
Figure 2B:
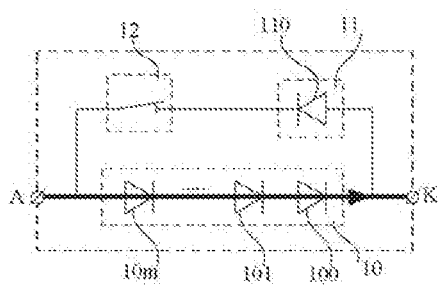
Figure 2C:
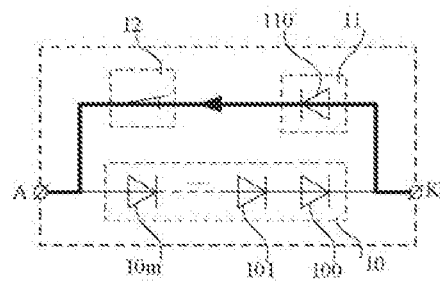

FIGS. 2A, 2B and 2C show commutation operation of the bidirectional power valve according to FIG. 1. It is described with an embodiment where the first power diode arrangement 10 includes a plurality of the first power diode units 100, 101 . . . 10m connected in series, and the second power diode arrangement 11 includes one second power diode unit 110.

As shown in FIG. 2A, the first power diode arrangement 10 of a first conducting direction D1 is forward-biased while a voltage across the first power diode arrangement 10 is placed across series-connected opened mechanical disconnector 12 and a second power diode arrange 12 of the second conducting direction D2. The DC current flows through the first power diode arrangement 10 is indicated by the arrow.

As shown in FIG. 2B, when power flow reverse operation is required, a closing demand is sent to the mechanical disconnector 12 and thus it is closed. The current remains conducting through the first power diode arrangement 11 as shown by the arrow. As shown in FIG. 2C, after the current decreases to zero and change its direction, the first power diode arrangement 10 is reverse biased and the series-connected second power diode arrangement 11 and the closed mechanical disconnector 12 will start conducting and the current flow is reversed. The second power diode arrangement 11 is forward-biased.

Figure 3A:
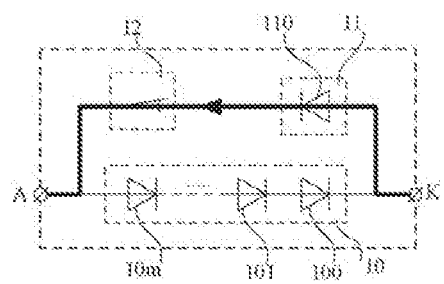
FIGS. 3A, 3B and 3C show commutation operation of the bidirectional power valve according to FIG. 1.
Figure 3B:
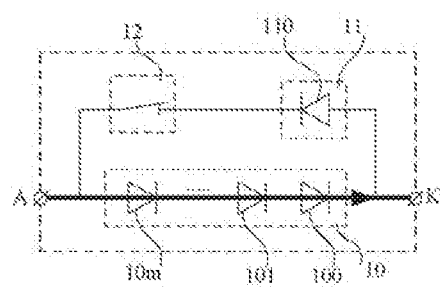
Figure 3C:
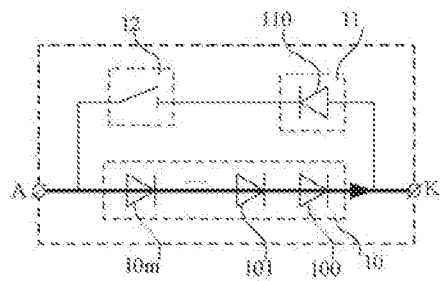

FIGS. 3A, 3B and 3C show commutation operation of the bidirectional power valve according to FIG. 1. It is described with an embodiment where the first power diode arrangement 10 includes a plurality of the first power diode units 100, 101 . . . 10m connected in series, and the second power diode arrangement 11 includes one second power diode unit 110.

As shown in 3A, the bidirectional power valve 1 operates under current flow reverse mode and the current (indicated by the arrow) flows through the mechanical disconnector 12 and the second power diode arrangement 11. As shown in 3B, after the direction of the current changes, it will flow through the first power diode arrangement 10 (indicated by the arrow) and thus the first power diode arrangement is forward-biased. As shown in 3C, when the current flow returns to normal mode, the switching-open command will be sent to the mechanical disconnector 12 to open the current path through the series-connected second power diode arrangement 11 and the mechanical disconnector 12. Since the DC voltage of the second power diode arrangement 11 is clamped by the first power diode arrangement 10, the voltage stress on the second power diode arrangement 11 during opening the mechanical disconnector 12 should be relatively low. In addition, there is almost no current stress on the mechanical disconnector 12 during the disconnect operation because the current has been reduced to zero before the mechanical disconnector 12 is opened. Therefore, when designing the bidirectional power valve, the relevant parameters of its components could be selected at relatively low ratings, which will be explained with example hereafter.

Design of Components of the Bidirectional Power Valve

Figure 4:
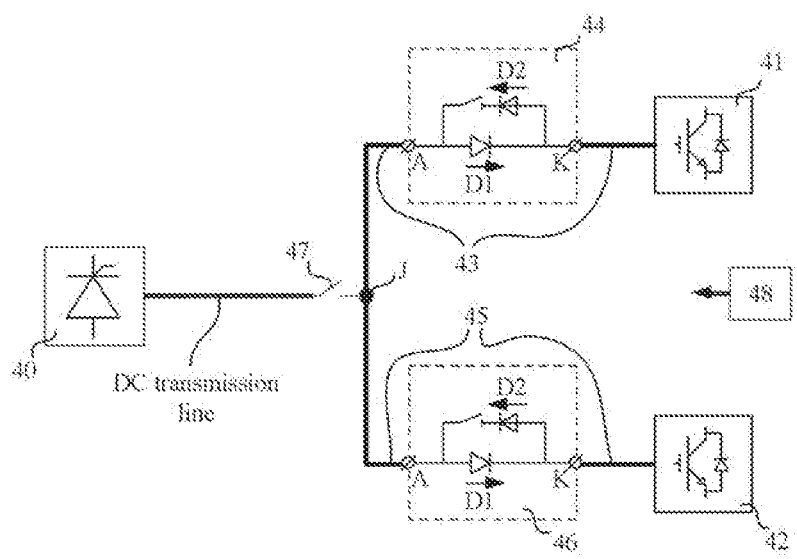
FIG. 4 illustrates a hybrid MTDC system using the bidirectional valve according to FIG. 1.

In order to explain the design of the valve, it is employed in a three-terminal hybrid MTDC system as an example, which has one LCC (line commutated converter) as rectifier and two VSCs (voltage source converter) as inverter. In the application, the valve is equipped in the DC line of each VSC DC side respectively as shown in FIG. 4.

Assuming the hybrid MTDC system is 400 kV/800 MW monopole DC system. The LCC as rectifier controls the DC voltage, with the nominal DC line voltage ($U_{dLRN}$) as $U_{dLRN}$=400 kV The nominal DC current ($I_{dRN}$) of LCC is $I_{dRN}$=2 kA Between LCC and each VSC, a transmission line is used with a certain length. The voltage drop in the transmission line is assumed as 7 kV. Therefore, the nominal DC line voltage of each VSC ($U_{dLIN}$) is $U_{dLIN}$=393 kV Due to the same capacity of the both VSCs, the nominal DC current of each VSC ($I_{dIN}$) is $I_{dIN}$=1 kA 1) The First Power Diode Arrangement As the previous analysis, the first power diode arrangement 10 shown in FIG. 1 takes responsibility for the power flow path in the most running time.

Voltage Stress and Current Stress

In the worst case, the first power diode arrangement 10 will withstand a full DC voltage of a high voltage DC conductor, for example the DC voltage when there is a DC fault at the DC transmission line of a hybrid MTDC system. During normal operation, the DC current flows through the first power diode valve 10 is the same as the DC current of the LCC rectifier and the VSC inverter of the hybrid MTDC system. Thus the voltage rating of the first power diode arrangement 10 ($U_{diodeN}$) can be defined as $U_{diodeN}=U_{dLIN}$=393 kV The current rating of the first power diode arrangement 10 ($I_{diodeN}$) can be defined as $I_{diodeN}=I_{dIN}$=1 kA Number of first power diode units 100, 101 . . . 10m of the first power diode arrangement The number of the series connected first power diode units can be calculated below:

$$n_s = k_s * \frac{U_{dLIN}}{V_{RRM}}$$

Where $n_s$ is the number of the first power diode units, $U_{dLIN}$ is the nominal DC voltage of VSC inverter, $V_{RRM}$ is the maximum repeat reverse voltage peak value of the first power diode unit, $k_s$ is a coefficient considering the redundancy.

The normal recovery diode unit (type 5SDD10F6000) is selected for the first power diode arrangement design. The key parameters of the first power diode unit are as listed below:

$V_{RRM}$=6,000 V (Repetitive peak reverse voltage)
$I_{FAVm}$=1,363 A (Average forward current)
$I_{FSM}$=17,500 A (Non repetitive peak surge current)
$V_{T0}$=1.015 V (Threshold voltage)
$R_T$=0.407 mΩ (Conduction resistance)

Consider $k_s$=2 for redundancy, the total number ($n_{s\_Dm}$) of the first power diode units is calculated:

$$n_{s\_Dm} = k_s * \frac{U_{dLIN}}{V_{RRM}} = 2 * \frac{393}{6} = 131$$

Power Losses of the First Power Diode Arrangement

The conduction loss of the first power diode arrangement during normal operation is calculated below:

$P_{diode}=n_s*(I_{dIN}*V_{T0}+I_{dIN}^2*R_T)$

Where $R_T$ is the conduction resistance of the first power diode unit.

This gives $$P_{diode\_Dm} = n_{s\_Dm} * (I_{dIN} * V_{T0} + I_{dIN}^2 * R_T)$$

$$= 131 * (1 * 1.015 + 1^2 * 0.407)$$

$$= 186 \text{ kW}$$

Where $P_{diode\_Dm}$ is the conduction loss of the first power diode arrangement.

2) The Second Power Diode Arrangement

Voltage Stress

The mechanical disconnector 12 isolates the second power diode arrangement 11 from the primary voltage across the first power diode arrangement 10 during DC fault. Thus, the required voltage rating of second power diode arrangement is significantly reduced.

A successful commutation of the line current from the series-connected second power diode arrangement 11 and mechanical disconnector 12 to the first power diode arrangement 10 on the stage of FIG. 3B requires a voltage rating of the second power diode arrangement 11 exceeding the on-state voltage of the first power diode arrangement 10. The voltage stress ($U_{diode\_Da}$) of the second power diode arrangement can be defined as:

$U_{diodeDa}=n_{s\_Dm}*V_{T0}$=131*1.015=133 V

Current Stress

The current flows the second power diode arrangement flows during the bypass stage as shown in FIG. 2B. Thus, the current stress ($I_{diode\_Da}$) of the second power diode arrangement can be defined as:

$I_{diode\_Da}=I_{dIN}$=1 kA

Number of the Second Power Diode Unit

The number ($n_{s\_Da}$) of the series connected second power diode unit for the second power diode arrangement can be calculated below:

$$n_{s\_Da} = k_s * \frac{U_{diode\_Da}}{V_{RRM}} = 1 * \frac{133}{6000} = 1$$

Where $k_s$=1 for redundancy due to large voltage gap with the diode type 5SDD10F6000.

Power Losses of the Second Power Diode Arrangement

The power loss of the second power diode arrangement ($P_{diode\_Dm}$) during bypass operation as shown in FIG. 2B is calculated below:

$$P_{diode\_Dm} = n_{s\_Dm} * (I_{dIN} * V_{T0} + I_{dIN}^2 * R_T)$$

$$= 1 * (1 * 1.015 + 1^2 * 0.407)$$

$$= 1.422 \text{ kW}$$

The 1.4 kW of power loss can be nearly ignored in an 800 MW system.

3) Mechanical Disconnector

The voltage stress ($U_{sN}$) and current stress ($I_{sN}$) of the mechanical disconnector 12 can be defined as:

$U_{sN}=U_{dLIN}$=393 kV $I_{sN}=I_{dIN}$=1 kA

And the mechanical disconnector is not required for the current breaking function.

The mechanical disconnector 12 is also a low cost solution because high speed switching is not needed. Thus a conventional AC circuit breaker can be employed here.

4) Total Cost and Power Losses

The device just employs low cost diode units and mechanical disconnector. And there is only one control signal for the mechanical disconnector. Therefore, the cost is dramatically lower than the cost of DC circuit breaker (DCCB). The power loss of the device is also extremely low. In the example of 800 MW hybrid 3-terminal MTDC system, the total power losses of the device are only a small part of the nominal DC power during normal operation, which is about 2×186 kW/800 MW×100%=0.047%. Furthermore, the power losses can be ignored during the bypass operation.

The bidirectional power valve for high voltage DC conductor according to FIG. 1 can be used for substitution of the power diode installed in the high voltage DC conductor close to the VSC inverter as discussed in the paper "A LCC and MMC hybrid HVDC topology with DC line fault clearance capability". This makes it possible for meeting the requirement of power support between VSCs, for example as a consequence of fault of LCC Rectifier.

FIG. 4 illustrates a hybrid MTDC system using the bidirectional valve according to FIG. 1. As shown in FIG. 4, the hybrid MTDC system includes a LCC 40 operating as rectifier, a first VSC 41 operating as inverter, and a second VSC 42 operating as inverter as well. The first VSC-based inverter 41 is connected to either of the LCC-based rectifier and the second VSC-based inverter via a high voltage DC conductor 43 and the bidirectional power valve 44 according to FIG. 1, such that the LCC-based rectifier 40 can supply direct current to the first VSC-based inverter 41. For example, the point K of the bidirectional power valve 44 is connected to the first VSC-based inverter 41 via a portion of the high voltage DC conductor 43 for conducting the current to latter, and its point A is connected to the LCC-based rectifier 40 via the other portion of the high voltage DC conductor 43 for providing a potential current path via which the first VSC-based inverter 41, which has been switched to rectifier operation mode, may supply current to the second VSC-based inverter 42. And, preferably another bidirectional valve 46 according to FIG. 1 is arranged to be connected to the VSC-based inverter 42 in case that the VSC-based inverter 42 is considered to supplying power to the VSC-based inverter 41; otherwise, it can be replaced by a power diode. The second VSC-based inverter 42 is connected to either of the LCC-based rectifier and the first VSC-based inverter via a high voltage DC conductor 45 and the bidirectional power valve 46 according to FIG. 1, such that the LCC-based rectifier 40 can supply direct current to the second VSC-based inverter 42. For example, the point K of the bidirectional power valve 46 is connected to the second VSC-based inverter 42 via a portion of the high voltage DC conductor 45 for conducting the current to latter, and its point A is connected to the LCC-based rectifier 40 via the other portion of the high voltage DC conductor 45 for providing a potential current path via which the second VSC-based inverter 42, which has been switched to rectifier operation mode, may supply current to the first VSC-based inverter 41. Point A of the bidirectional power valve 44 and point A of the bidirectional power valve 46 are connected with each other via the portion of the high voltage DC conductor 43 and that of the high voltage DC conductor 45. The first conducting direction D1 of the first power diode arrangement 10 of the bidirectional power valve 1 points towards the first VSC-based inverter 41, configured to block a fault current path from the first VSC-based inverter 41 to the earth via the high voltage DC conductor 43. As regards the preferable embodiment, the first conducting direction D1 of the first power diode arrangement 10 of the another bidirectional power valve 1 points towards the first VSC-based inverter 42.

In the hybrid MTDC system 4, the LCC-based rectifier 40 has the largest capacity in the system 4. Thus, it is employed as the DC voltage control terminal. The first VSC-based inverter 41 and the second VSC-based inverter 42 control their own power respectively. Similar as presented in the paper "A LCC and MMC hybrid HVDC topology with DC line fault clearance capability", the DC transmission line fault will not result in discharging current from the first VSC-based inverter 41 and the second VSC-based inverter 42 due to the reverse bias of the first power diode arrangement of the first power diode arrangement of the bidirectional power valves 44, 46.

In normal operation, the first power diode arrangement of the bidirectional power valve 44 is forward-biased while a voltage across the first power diode arrangement being placed across series-connected the opened mechanical disconnector and the second power diode arrange of the bidirectional power valve 44. The LCC-based rectifier 40 supplies current to the first VSC-based inverter 41 through the first power diode arrangement of the bidirectional power valve 44.

Where the LCC-based rectifier 40 is controlled to be blocked by a system controller 48, in general as a consequence of the high voltage DC conductor short-circuit to earth or a fault with itself, the system controller 48 may send a message to the power valve controller of the bidirectional power valve 44. Accordingly, the mechanical disconnector of the bidirectional power valve 44 is controlled to be closed by the power valve controller of the bidirectional power valve 44. The system controller 48 controls the first VSC-based inverter 41 to be switched to operate as a rectifier. The second power diode arrangement of the bidirectional power valve 44 is forward-biased and the first VSC-based inverter 41 operating as the rectifier supplies power to the second VSC-based inverter 42 via the closed mechanical disconnector and the second power diode arrangement of the bidirectional power valve 44.

If the fault is cleared and the hybrid MTDC system is to be switched back to the normal operation, the LCC-based rectifier 40 is de-blocked by system controller 48 so as to supply power to the first and second VSC-based inverters 41, 42. The system controller 48 controls the first VSC-based inverter 41 to be switched back to operate as inverter. The first power diode arrangement of the bidirectional power valve 44 is forward-biased by the LCC-based rectifier 40. Then the mechanical disconnector of the bidirectional power valve 44 is opened as controlled by the power valve controller of the bidirectional power valve 44.

The skilled person shall understand that a switch 47 can be placed in the DC transmission line close to the joint point J of the high voltage DC conductions 43, 45, thus that when the VSC-based inverter is switched to rectifier operation, for example the first VSC-based inverter operating as rectifier, the switch 47 can be opened so that the current supplied by the first VSC-based inverter 41 is restricted in a direction to the second VSC-based inverter 42.

By replacing the power diode of single conducting direction with the bidirectional power valve, the VSC-based inverters are able to support power therebetween during the LCC-based rectifier is blocked. This makes it possible achieving on-line effortless power reverse of VSC in the hybrid MTDC system, and still retaining the worthy DC fault clearance capability with the power valve.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A bidirectional power valve for current occurring in a high voltage DC conductor, the bidirectional power valve comprising:
    a first power diode arrangement of a first conducting direction;
    a second power diode arrangement of a second conducting direction that is opposite the first conducting direction relative to a common connection of the first and second power diode arrangements;
    a mechanical disconnector connected in series with the second power diode arrangement, wherein the second power diode arrangement and the mechanical disconnector are connected in parallel with the first power diode arrangement; and
    a power valve controller configured to control opening of the mechanical disconnector in response to a commutation of the high voltage DC conductor current direction from the second conducting direction to the first conducting direction and to control closing of the mechanical disconnector in response to a commutation of the high voltage DC conductor current direction from the first conducting direction to the second conducting direction.

2. The bidirectional power valve according to claim 1, wherein the first power diode arrangement comprises a plurality of first power diode units connected in series.

3. The bidirectional power valve according to claim 2, wherein the second power diode arrangement comprises a second power diode unit.

4. The bidirectional power valve according to claim 3, wherein a peak inverse voltage of the second power diode unit is substantially equal to or greater than the sum of forward-biased voltages of the plurality of first power diode units and less than a predetermined multiple of the sum.

5. The bidirectional power valve according to claim 1, further comprising a current sensor configured to sense a direction of the high voltage DC conductor current and to send a signal representing it to the power valve controller.

6. The bidirectional power valve according to claim 5, wherein the mechanical disconnector is controlled to be opened where the signal from the current sensor indicates the high voltage DC conductor current direction is lined with the first conducting direction of the first power diode arrangement.

7. A hybrid multi-terminal high voltage direct current system, comprising:
    a high voltage DC conductor;
    a bidirectional power valve comprising a first power diode arrangement of a first conducting direction, a second power diode arrangement of a second conducting direction that is opposite the first conducting direction relative to a common connection of the first and second power diode arrangements, and a mechanical disconnector connected in series with the second power diode arrangement in series, wherein the series-connected second power diode arrangement and the mechanical disconnector are connected in parallel with the first power diode arrangement;
    a power valve controller configured to control opening of the mechanical disconnector in response to a commutation of the high voltage DC conductor current direction from the second conducting direction to the first conducting direction and to control closing of the mechanical disconnector in response to a commutation of the high voltage DC conductor current direction from the first conducting direction to the second conducting direction;
    a LCC-based rectifier;
    a first VSC-based inverter; and
    a second VSC-based inverter;
    wherein the first VSC-based inverter is connected to the LCC-based rectifier or the second VSC-based inverter via the high voltage DC conductor and the bidirectional power valve; and
    wherein the first conducting direction of the first power diode arrangement of the bidirectional power valve points towards the first VSC-based inverter.

8. The system according to claim 7, further comprising a system controller configured to control blocking/deblocking of the LCC-based rectifier and to switch the first VSC-based inverter to operate as a rectifier.

9. A direct current path commutation method, comprising:
    forward biasing a first power diode arrangement of a first conducting direction while a voltage across the first power diode arrangement is connected across a series-connected opened mechanical disconnector and a second power diode arrangement of a second conducting direction, wherein the first power diode arrangement is arranged in parallel with the series-connected opened mechanical disconnector and second power diode arrangement;
    closing the mechanical disconnector;
    forward biasing the second power diode arrangement, wherein the first conducting direction of the first power diode arrangement and the second conducting direction of the second power diode arrangement are opposite to each other; and
    closing the mechanical disconnector and forward biasing the second power diode arrangement after forward biasing the first power diode arrangement.

10. The method according to claim 9, wherein, after the mechanical disconnector is closed and the second power diode arrangement is forward biased, the method further comprising:
    forward biasing the first power diode arrangement; and
    opening the mechanical disconnector.

11. The method according to claim 10, wherein the mechanical disconnector is opened after the first power diode arrangement is closed.

12. A method of operating a hybrid multi-terminal high voltage direct current system, the method comprising:
    forward biasing a first power diode arrangement of a first conducting direction while a voltage across the first power diode arrangement is connected across a series-connected opened mechanical disconnector and second power diode arrangement of a second conducting direction, wherein the first power diode arrangement is arranged in parallel with the series-connected opened mechanical disconnector and second power diode arrangement;

supplying power from a LCC-based rectifier to a first VSC-based inverter through the first power diode arrangement;

closing the mechanical disconnector;

blocking the LCC-based rectifier and switching the first VSC-based inverter to operate as a rectifier; and forward biasing the second power diode arrangement and supplying power from the first VSC-based inverter operating as the rectifier to a second VSC-based inverter via the closed mechanical disconnector and the second power diode arrangement, wherein the first conducting direction of the first power diode arrangement and the second conducting direction of the second power diode arrangement are opposite to each other.

13. The method according to claim 12, wherein, after forward biasing the second power diode arrangement and supplying power from the first VSC-based inverter to a second VSC-based inverter, the method further comprises:

de-blocking the LCC-based rectifier and switching the first VSC-based inverter to operate as an inverter;

forward biasing the first power diode arrangement; and opening the mechanical disconnector.

14. The method according to claim 13, wherein the mechanical disconnector is opened after the first power diode arrangement is closed.

* * * * *